(12) United States Patent
Nakashima et al.

(10) Patent No.: US 8,429,462 B2
(45) Date of Patent: Apr. 23, 2013

(54) STORAGE SYSTEM AND METHOD FOR AUTOMATIC RESTORATION UPON LOOP ANOMALY

(75) Inventors: Kazuo Nakashima, Kawasaki (JP); Daiya Nakamura, Kawasaki (JP); Kouichi Tukada, Kawasaki (JP); Atsushi Ishii, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1008 days.

(21) Appl. No.: 11/525,927

(22) Filed: Sep. 25, 2006

(65) Prior Publication Data

US 2008/0010547 A1 Jan. 10, 2008

(30) Foreign Application Priority Data

May 25, 2006 (JP) ................................. 2006-144768

(51) Int. Cl.
*G06F 11/00* (2006.01)

(52) U.S. Cl.
USPC ............................................................ 714/43

(58) Field of Classification Search ...................... 714/43
See application file for complete search history.

(56) References Cited

U.S. PATENT DOCUMENTS

2004/0042408 A1* 3/2004 Sakai ............................ 370/241
2004/0172489 A1* 9/2004 Shikada ........................... 710/15
2005/0022050 A1* 1/2005 Nagata et al. ...................... 714/5
2005/0027919 A1* 2/2005 Aruga ............................ 710/316

OTHER PUBLICATIONS

Embedded Storage Switch "SOC 422" Specification, downloaded from the internet address: www.emulex.com/products/fcswitch/422/ds.html.
Patent Abstracts of Japan; Japanese Publication No. 2001-306262; Japanese Publication date Nov. 2, 2001.

* cited by examiner

*Primary Examiner* — Scott Baderman
*Assistant Examiner* — Jigar Patel
(74) *Attorney, Agent, or Firm* — Fujitsu Patent Center

(57) ABSTRACT

A storage system has a controller and a plurality of storage devices connected to a pair of loops, the controller diagnoses storage devices and performs automatic high-speed restoration of the loops. A storage system has a controller, a plurality of storage devices, and switch circuits having a plurality of switches to connect each of the plurality of storage devices to loops. When a loop anomaly is detected, a restoration instruction is issued to a switch circuit, the plurality of switches are operated in parallel, storage devices are diagnosed, and according to the diagnosis results, a storage device judged to be anomalous are bypassed from the loop by operating the switches. When a loop anomaly is detected, diagnosis of the disk drives connected to the loop can be performed in parallel, so that the time until automatic restoration of the loop can be greatly reduced.

16 Claims, 16 Drawing Sheets

STORAGE SYSTEM AND METHOD FOR AUTOMATIC RESTORATION UPON LOOP ANOMALY

CROSS-REFERENCE TO RELATED APPLICATIONS

This application is based upon and claims the benefit of priority from the prior Japanese Patent Application No. 2006-144768, filed on May 25, 2006, the entire contents of which are incorporated herein by reference.

BACKGROUND OF THE INVENTION

1. Field of the Invention

The present invention relates to a storage system which connects a plurality of magnetic disk devices or other physical disk devices in a loop and an automatic restoration method for same upon a loop anomaly, and in particular relates to a storage system which disconnects and bypasses a faulty storage device in a loop and automatically restores the loop, and an automatic restoration method for same upon a loop anomaly.

2. Description of the Related Art

In storage equipment utilizing magnetic disks, magneto-optical disks, optical disks or other storage media, storage media is physically accessed at the request of a data processing device. When the data processing device uses a large quantity of data, a storage system having a plurality of storage units and control devices is utilized.

In such a storage system, redundant configurations are adopted in order to improve the reliability of stored data and enhance equipment reliability and to speed data transfers, FC_AL (Fibre Channel Arbitrated Loop) interfaces are used. A large number of storage devices are connected in such FC_AL loops. Consequently, when a fault occurs in a storage device in a loop, the entire loop is affected. Hence automated loop restoration technology, in which the storage device in which the fault has occurred is disconnected from the loop and the effect on the entire loop is eliminated, is necessary.

In the prior art, the method shown in FIG. 16 has been known as a method of disconnecting a storage device (magnetic disk device) in which a fault has occurred from an FC_AL loop and restoring the loop.

As shown in FIG. 16, each of a plurality of magnetic disk devices 160, 162, 164 is connected to a pair of fibre channel loops 106, 108 by fibre switches 130 to 134 and 140 to 144. One of the fibre channel loops 106 is connected to the device adapter 102 of a controller by a fibre channel connector 114; the other fibre channel loop 108 is connected to the device adapter 104 of the controller by the fibre channel connector 116.

Both device adapters 102 and 104 are connected to the centralize control module 100 of the controller. Hence the centralize control module 100 can access each of the magnetic disk devices 160, 162, 164 by both one route (route a) via the device adapter 102 and one fibre channel loop 106, and by another route (route b) via the device adapter 104 and other fibre channel loop 108.

Disconnection control portions 150, 152 are provided in the fibre channel loops 106, 108. One of the disconnection control portions 150 controls disconnect (bypassing) of each of the fibre switches 130, 132, 134 in the fibre channel loop 106, and the other disconnection control portion 152 controls disconnect (bypassing) of each of the fibre switches 140, 142, 144 in the other fibre channel loop 108.

In the prior art, as shown in FIG. 16, upon detecting that one of the fibre channel loops 106 cannot be accessed, the centralized control module 100 uses the disconnection control portion 150 to repeat an operation to check the loop 106 by bypassing, in succession, one magnetic disk device at a time (for example Japanese Patent Laid-open No. 2001-306262).

For example, first the fibre switch 130 on the port "a" side of magnetic disk device 160 is switched to the bypass state, the magnetic disk device 160 is disconnected from the fibre channel loop 106, and a diagnostic signal is passed from the device adapter 102 to the fibre channel loop 106 to check the loop.

Next, the fibre switch 130 on the port "a" side of the magnetic disk device 160 is connected to the loop, and then the fibre switch 132 on the port "a" side of the next magnetic disk device 162 is switched to the bypass state, to disconnect the magnetic disk device 162 from the fibre channel loop 106, and a diagnostic signal is passed from the device adapter 102 to the fibre channel loop 106 to check the loop.

Thereafter, each of the magnetic disk devices in the fibre channel loop 106 is disconnected from the loop in succession, and the loop is checked. When the anomalous magnetic disk device is identified by this procedure, the switch 132 on the port "a" side of the magnetic disk device (in FIG. 16, magnetic disk device 162) is disconnected. By this means, the loop 106 is made to function normally, and at the same time the magnetic disk device 162 can be accessed from port "b" on the side of the fibre channel loop 108.

Normally, several tens (for example, up to a maximum of 60) of magnetic disk devices are connected to a single fibre channel loop. Consequently when using a loop check method in which one disk at a time is bypassed, as in the technology of the prior art, the time required for automatic loop restoration is from several tens of seconds to several minutes approximately, so that the restoration time is lengthened. Because access to magnetic disk devices is halted during the automatic restoration operation, disk access times by a host become longer. Hence using the technology of the prior art, time is required for restoration processing when there is an anomaly in one loop, and the time required for disk access by a host is lengthened.

In order to reduce the host wait time, a method may be adopted in which even when an anomaly is detected in one loop, magnetic disk devices are accessed from the other loop, and only when anomalies are judged to have occurred in both loops is loop restoration processing begun. However, when using this method one loop cannot be used, so that processing performance is diminished, and to this extent the disk access times for hosts cannot be shortened.

Moreover, even when a loop is automatically restored, rebuild/copy-back and other RAID (Redundant Array of Independent Disks) restoration processing are begun, so that the disk access time for hosts is further lengthened.

Hence an object of this invention is to provide storage system and an automatic restoration method for same in the event of a loop anomaly, to quickly perform loop restoration processing when a loop anomaly occurs.

A further object of this invention is to provide storage system and an automatic restoration method for same in the event of an anomaly of a loop on one side, to quickly perform processing to restore the loop on that side.

Still a further object of this invention is to provide storage system and an automatic restoration method for same in the event of a loop anomaly, to quickly identify a storage device in which a fault has occurred, bypass the storage device, and perform automatic restoration.

SUMMARY OF THE INVENTION

In order to attain these objects, storage system of this invention has a plurality of storage devices; at least one controller, which controls access to the plurality of storage devices; a pair of loops, in which information circulates in a single direction, to exchange information between the controller and the plurality of storage devices; and switch circuits, provided in each loop, having a plurality of switches to connect the loop to each of the plurality of storage devices. When the controller detects a loop anomaly while accessing the storage devices, the controller issues an instruction to the switch circuit to restore the loop, and in response to the restoration instruction, the switch circuit performs operations on the plurality of switches in parallel, diagnoses the storage devices, and according to the diagnosis results, bypasses a storage device in which an anomaly has been judged to occur from the loop by means of a switching operation.

Further, an automatic restoration method upon a loop anomaly of this invention is a method of automatic restoration of storage system in which storage devices are accessed in response to data access requests from a requesting device, and has a step of detecting a loop anomaly during accessing of a storage device by a controller connected by a pair of loops to the plurality of storage devices; a step, in response to detection of the loop anomaly, of issuing an instruction from the controller to a switch circuit having a plurality of switches, which connect the loop to each of the plurality of storage devices, to restore the loop; and, a step, in response to this restoration instruction, of performing restoration by using the switch circuit to perform operations in parallel on the plurality of switches, diagnosing the storage devices, and in response to the diagnosis result, bypassing a storage device judged to be anomalous from the loop by means of a switch operation.

In this invention, it is preferable that while accessing the storage devices via one of the loops, upon detecting an anomaly in the one loop, the controller issues an instruction to restore the loop to the switch circuit of the one loop.

In this invention, it is preferable that, in response to diagnosis results of the switch circuit, the controller disconnect the storage device judged to be anomalous from access objects.

In this invention, it is preferable that the storage system have a port control circuit which controls the switch circuits of the loops, and that the port control circuit issue bypass instructions for all switches to a switch circuit in response to a restoration instruction, and, after the switch circuit has bypassed all switches, issues a diagnosis instruction to the switch circuit.

In this invention, it is preferable that, in response to the diagnosis instruction, the switch circuit controls that all switches loop-back, and in response to a signal from a storage device, execute diagnosis.

In this invention, it is preferable that, after executing diagnosis, the switch circuit connect the switches of storage devices not judged to be anomalous to the loop.

In this invention, it is preferable that the controller execute processing to incorporate storage devices in the loop based on the diagnosis results.

In this invention, it is preferable that the controller has a control unit, which controls accessing of the plurality of storage devices, and a service controller, connected to the switch circuits, which issues the restoration instructions to the switch circuits.

In this invention, it is preferable that the controller has a channel circuit, to control the interface with the requesting device; a device circuit, which sends and receives information with the storage device via the loops; a control unit, which controls the channel circuit and the device circuit, and which accesses the storage devices in response to data access requests from the requesting device; and a service controller, connected to the control unit, which connects the switch circuits.

In this invention, it is preferable that the plurality of storage devices have a RAID configuration.

In this invention, it is preferable that the storage devices be disk drives.

In this invention, a switch circuit having a plurality of switches to connect each of a plurality of storage devices to a loop is used, and when a loop anomaly is detected, a restoration instruction is issued to the switch circuit, a plurality of switches are operated in parallel, storage device diagnoses are performed, and a storage device judged to be anomalous is bypassed from the loop by means of switch operation according to the diagnosis results. Hence when a loop anomaly is detected, diagnoses of disk drives connected to the loop can be performed in parallel, so that the time until automatic loop restoration can be greatly shortened.

DESCRIPTION OF THE PREFERRED EMBODIMENTS

Below, embodiments of the invention are explained in the order of a configuration of a data storage system, automatic restoration processing of a data storage system, and other embodiments.

Configuration of a Data Storage System

Figure 1:
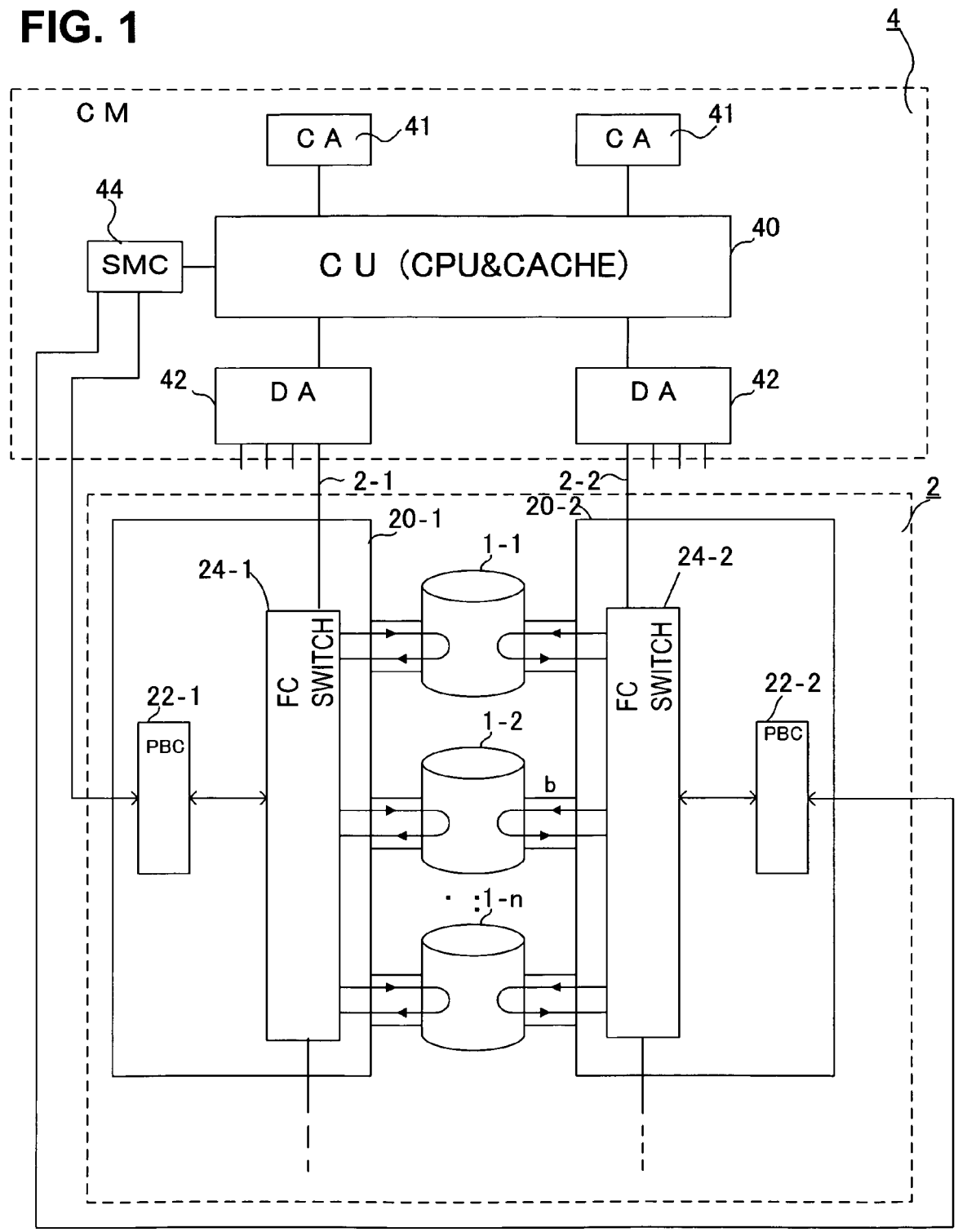
FIG. 1 shows the configuration of the storage system of an embodiment of the invention.
Figure 2:
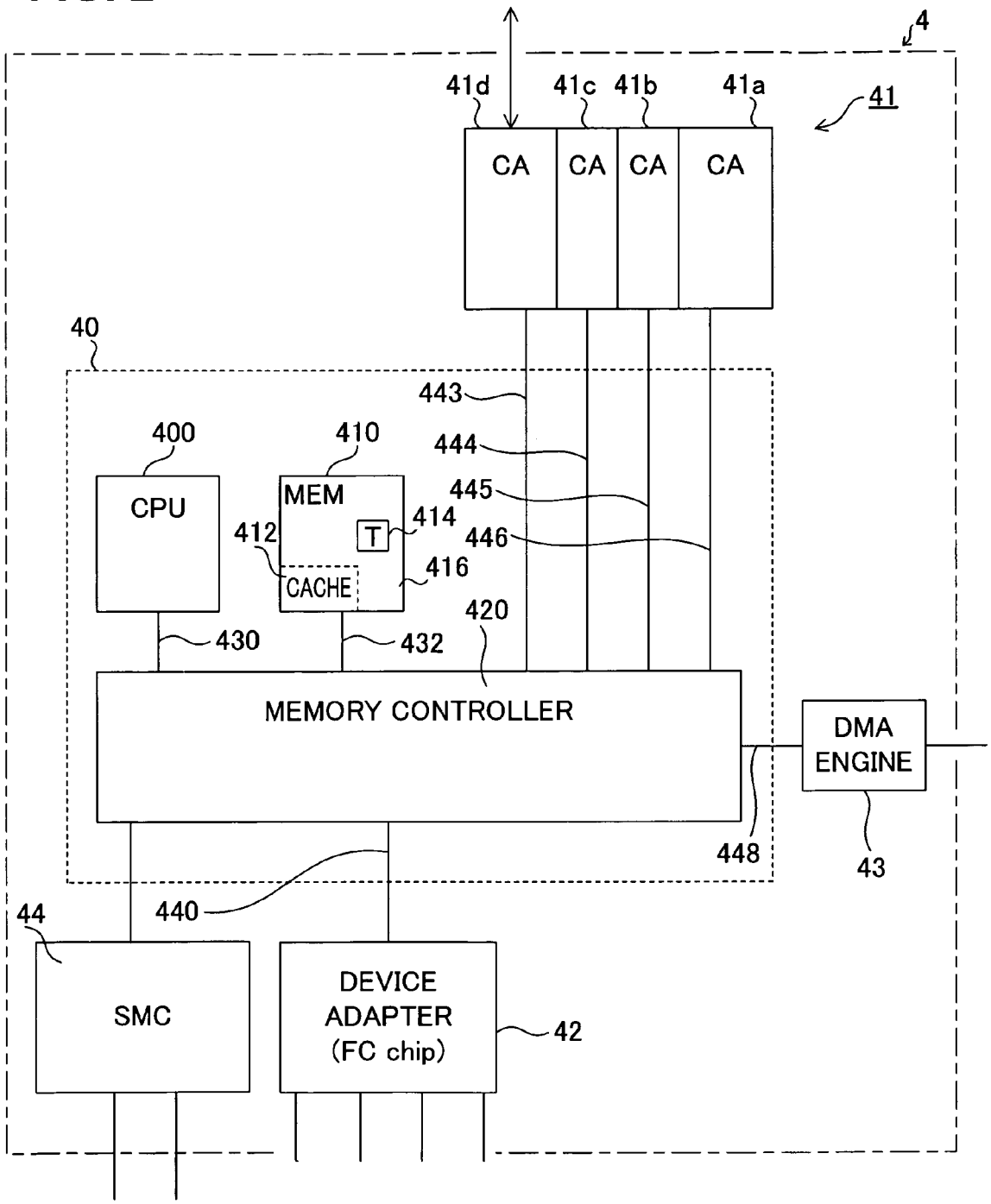
FIG. 2 shows the configuration of the centralize module of FIG. 1.
Figure 3:
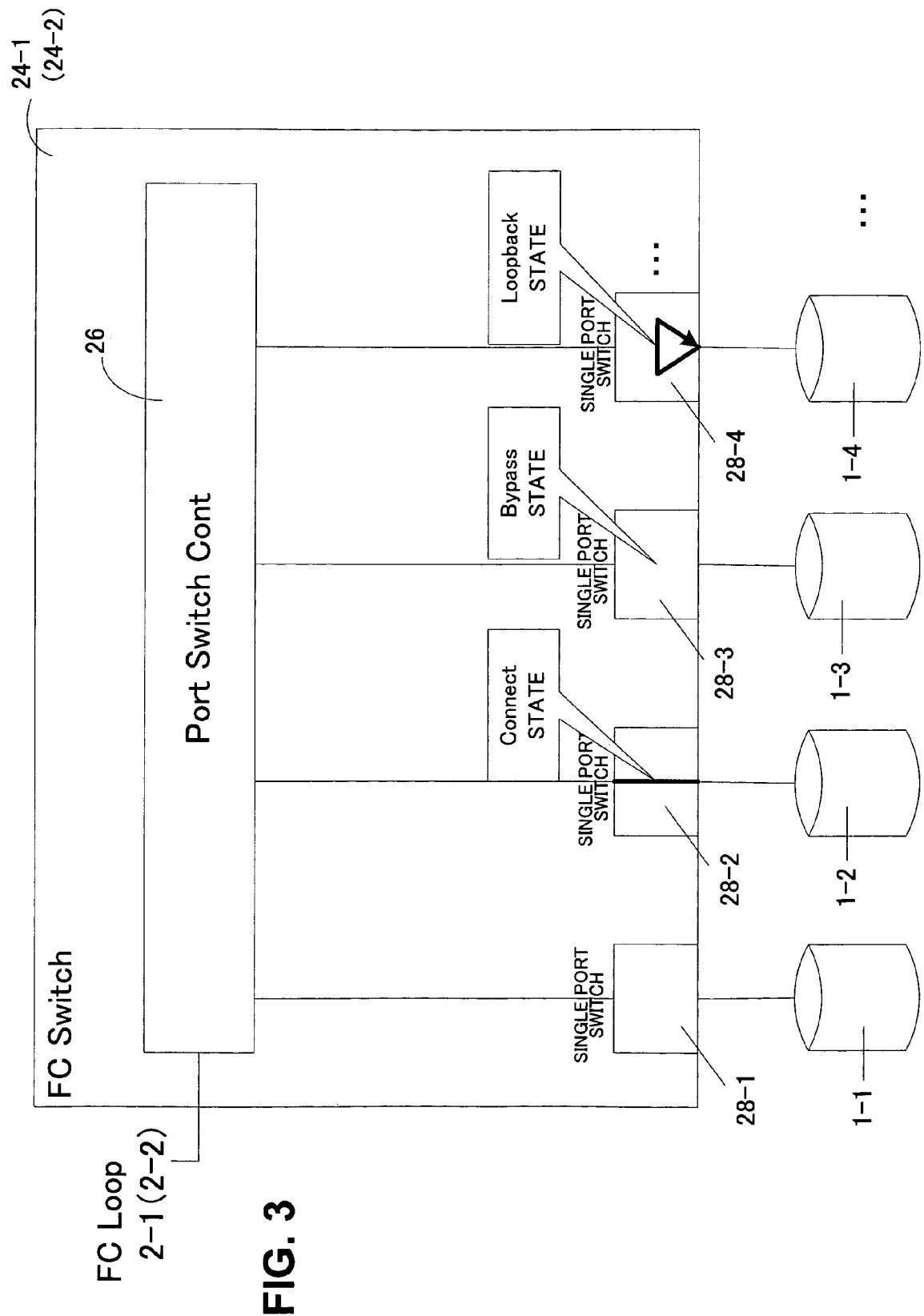
FIG. 3 shows the configuration of the FC switches of FIG. 1.
Figure 4:
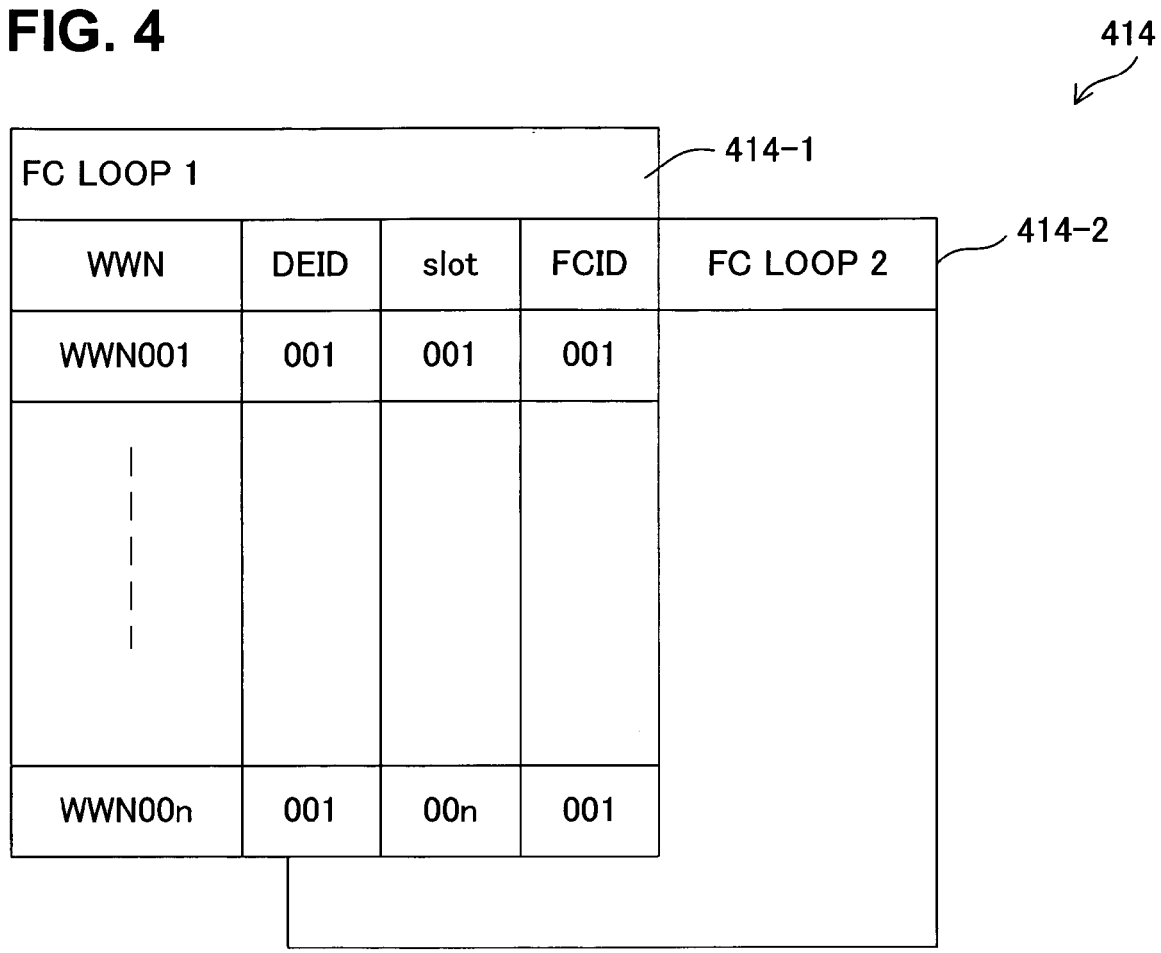
FIG. 4 explains the FC loop table of FIG. 1.

FIG. 1 shows the configuration of the storage system of an embodiment of the invention, FIG. 2 shows the configuration of the control module of FIG. 1, FIG. 3 shows the configuration of the FC switches of FIG. 1, and FIG. 4 explains the FC loop table of FIG. 2. FIG. 1 shows an example in which one storage controller (control module) is connected to one disk enclosure.

As shown in FIG. 1, the storage controller (centralize module) 4 has a control unit (cache manager) 40, a pair of channel adapters 41, and a pair of device adapters 42. The control unit 40 is connected to the service management controller 44.

The channel adapters 41 are connected to a host computer, not shown, via Fibre Channel or Ethernet (a registered trademark). The device adapters 42 are connected to each of the disk drives 1-1 to 1-n in the device enclosure 2 (described below) by for example Fibre Channel FC loops 2-1, 2-2.

That is, one of the disk adapters 42 of the centralize module 4 accesses each of the disk drives 1-1 to 1-n via the first FC loop 2-1, and the other disk adapter 42 accesses each of the disk drives 1-1 to 1-n via the second FC loop 2-2. By this means, a dually redundant connection path configuration is realized.

The device enclosure 2 has a pair of print boards 20-1 and 20-2, which respectively have port control circuits 22-1, 22-2 and FC switches 24-1, 24-2, as well as disk drives 1-1 to 1-n. Each of the FC switches 24-1 and 24-2 is connected to an FC loop 2-1, 2-2, as shown in FIG. 3, to connect, bypass, or perform loopback of the individual disk drives 1-1 to 1-n.

The port bypass circuits (abbreviated "PBCs") 22-1, 22-2 are connected to the service management controller 44 of the control module 4 via Ethernet (a registered trademark) or another network, and perform state management of the disk enclosure 2 and execute control of the FC switches 24-1, 24-2.

The service management controller (abbreviated "SMC") 44 receives state information for the device enclosure 2 from the port bypass circuits 22-1, 22-2, performs state monitoring, and issues necessary commands to the port control circuits 22-1, 22-2.

Hence each of the disk drives 1-1 to 1-n is connected to the control module 4 via two independent FC loops 2-1 and 2-2. Here, a single device enclosure 2 is shown; but a plurality of (for example, four of) such device enclosures 2 may be connected in series in the FC loops 2-1, 2-2.

As shown in FIG. 2, the control module 4 has a cache manager 40, a channel adapter (first interface portion; hereafter "CA") 41, device adapter (second interface portion; hereafter "DA") 42, and DMA (Direct Memory Access) engine (communication portion; hereafter "DMA") 43.

The cache manager 40 performs read/write processing based on processing requests (read requests and write requests) from the host computer, and comprises memory 410, a processing unit (CPU) 400, and a memory controller 420.

The memory 410 has a so-called cache area 412, which serves as cache for a plurality of disks to hold a portion of the data stored on the plurality of disk drives in the disk enclosure 2 of FIG. 1, an FC loop table 414, and another work area 416.

The processing unit (CPU) 400 executes control of the memory 410, channel adapter 41, device adapter 42, DMA 43, and service management controller 44. For this purpose, one or a plurality of CPUs 400 (in the figure, one) and a memory controller 420 are provided. The memory controller 420 controls reading and writing of the memory 410, and also performs path switching.

The memory controller 420 is connected to the memory 410 via the memory bus 432, and is connected to the CPU 400 via the CPU bus 430; the memory controller 420 is also connected to the device adapter 42 via a four-lane high-speed serial bus (for example, PCI-Express) 440.

Similarly, the memory controller 420 is connected via a four-lane serial buses (for example, PCI-Express) 443, 444, 445, 446 to the channel adapter 41 (here, four channel adapters 41a, 41b, 41c, 41d), and via a four-lane serial bus (for example, PCI-Express) 448 to the DMA 43.

This PCI-Express or other high-speed serial bus communicates using packets, and by providing a plurality of serial bus lanes, so-called low-latency communication is possible, with little delay and rapid response, even when the number of signal lines is reduced.

The channel adapters 41a to 41d are an interface with host computers; the channel adapters 41a to 41d are connected to different host computers. It is preferable that the channel adapters 41a to 41d be connected by a bus, such as for example a Fibre Channel or Ethernet (a registered trademark) bus, to the interface portions of the respective corresponding host computers; in this case, optical fiber or coaxial cable is used as the bus.

Further, each of the channel adapters 41a to 41d is configured as a portion of the control module 4. The channel adapters 41a to 41d support a plurality of protocols as interface portions between the corresponding host computers and the cache manager 40.

Because the protocols to be installed are not the same, depending on the corresponding host computers, the channel adapters 41a to 41d are mounted on print boards separate from the cache manager 40, to enable easy replacement as necessary.

For example, as protocols with host computers which are to be supported by the channel adapters 41a to 41d, in addition to those described above, Fibre Channel, and iSCSI (Internet Small Computer System Interface) supporting Ethernet (a registered trademark), and others can be used.

As stated above, each of the channel adapters 41a to 41d is directly connected to the cache manager 40 by a bus 443 to 446, designed to connect LSI (Large Scale Integration) devices to print boards, such as a PCI-Express or other bus. By this means, the high throughput required between the channel adapters 41a to 41d and the controller 40 can be realized.

Next, the device adapter 42 is an interface with each of the disk drives in the device enclosure, and here has four FC (Fibre Channel) ports.

Further, as stated above, the device adapter 42 is directly connected to the cache manager 40 by a bus designed to connect LSI (Large Scale Integration) devices to print boards, such as a PCI-Express or other bus. By this means, the high throughput required between the disk adapter 42 and the cache manager 40 can be realized.

As shown in FIG. 2, the DMA engine 43 communicates with the cache manager 40 of another control module, not shown, and is for example used in mirroring processing.

FIG. 3 is used to explain the FC switches of FIG. 1. The FC switch 24-1 (24-2) has port switches 28-1, 28-2, 28-3, 28-4, . . . , 28-n for connection, bypass and loopback of each of the disk drives (magnetic disk devices) 1-1 to 1-n, and a port switch controller 26 connected to the fibre channel loop 2-1 (2-2) to perform connection control with each of the port switches 28-1 to 28-n and the fibre channel loop 2-1 (2-2).

Figure 16:
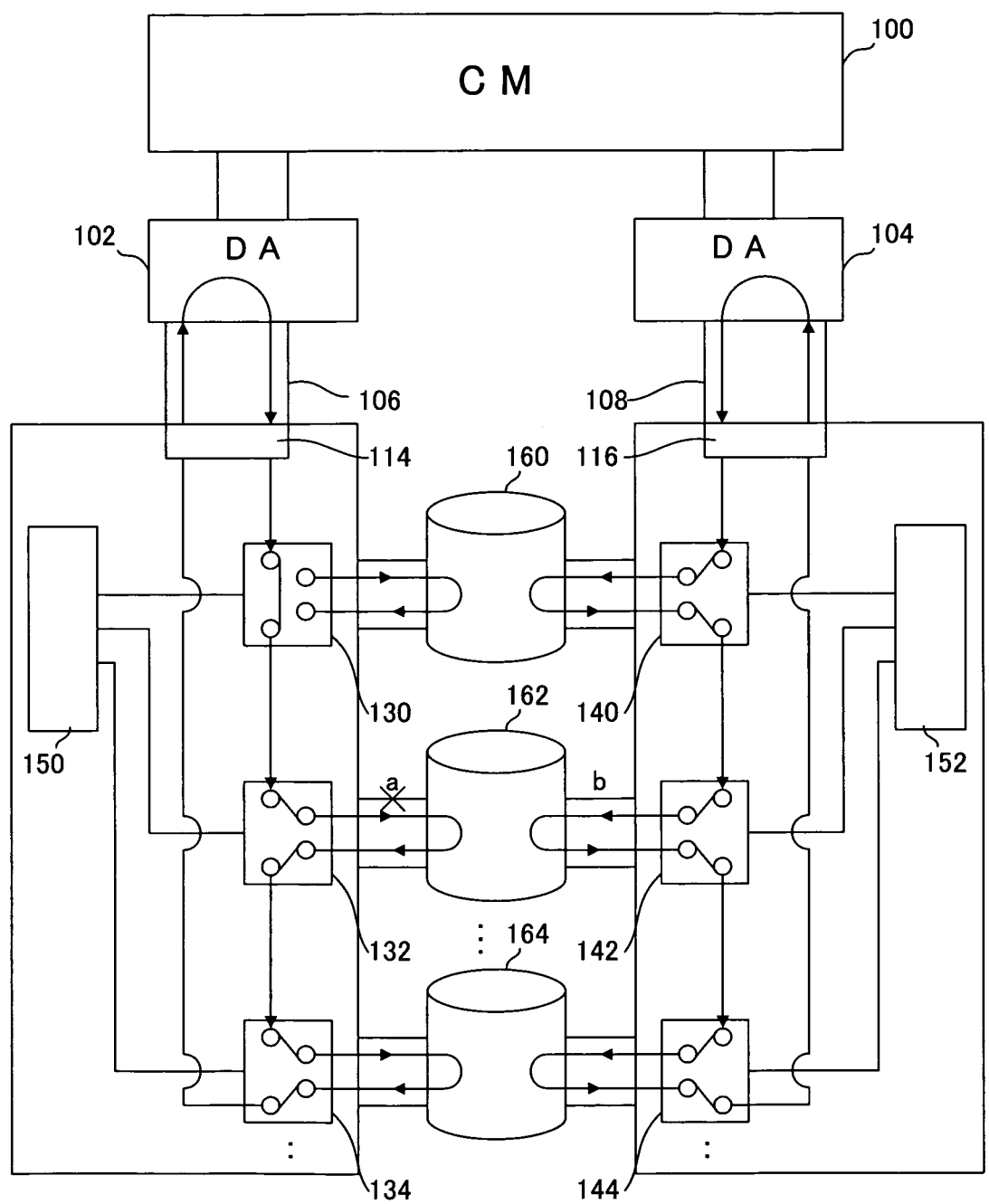
FIG. 16 explains automatic restoration control of the prior art.

The FC switch 24-1 (24-2) does not have an FC_AL loop configuration for physical serial connection to each of the disk drives, as shown in FIG. 16; but the port switch controller 26 logically emulates the sending and receiving of data in an FC_AL loop configuration, and controls reading from and writing to the disk drives.

That is, this port switch controller 26 analyzes the FC headers from the fibre channel loop 2-1 (2-2), and distributes the FC header commands to the relevant port switches 28-1 to 28-*n*. In other words, requests and data from the loop 2-1 (2-2) are directly exchanged with the disk drives 1-1 to 1-*n* via the relevant port switch 28-1 to 28-*n*.

The port switch controller 26 also performs diagnoses of each of the port switches 28-1 to 28-*n* in response to a PTBI (Port Test Before Insertion) instruction, and controls the switched states of each of the port switches 28-1 to 28-*n* according to the diagnosis results.

Each of the magnetic disk devices 1-1 to 1-*n* has a pair of FC (Fibre Channel) chips for connection to the two port switches, a control circuit, and a disk drive mechanism. The FC chips have CRC check functions.

As shown in FIG. 4, the fibre channel loop table (FC map) 414 has map tables 414-1 to 414-*m* for each fibre channel path 2-1, 2-2. Each of the map tables 414-1 to 414-*m* stores a WWN (World Wide Name) for the magnetic disk device connected to the fibre channel loop, an ID number for the disk enclosure 10 in which the magnetic disk device is housed, a slot number indicating the housing position of the magnetic disk device in the disk enclosure 10, and an ID number for the fibre channel loop.

Automatic Restoration Processing of a Data Storage System

Figure 5:
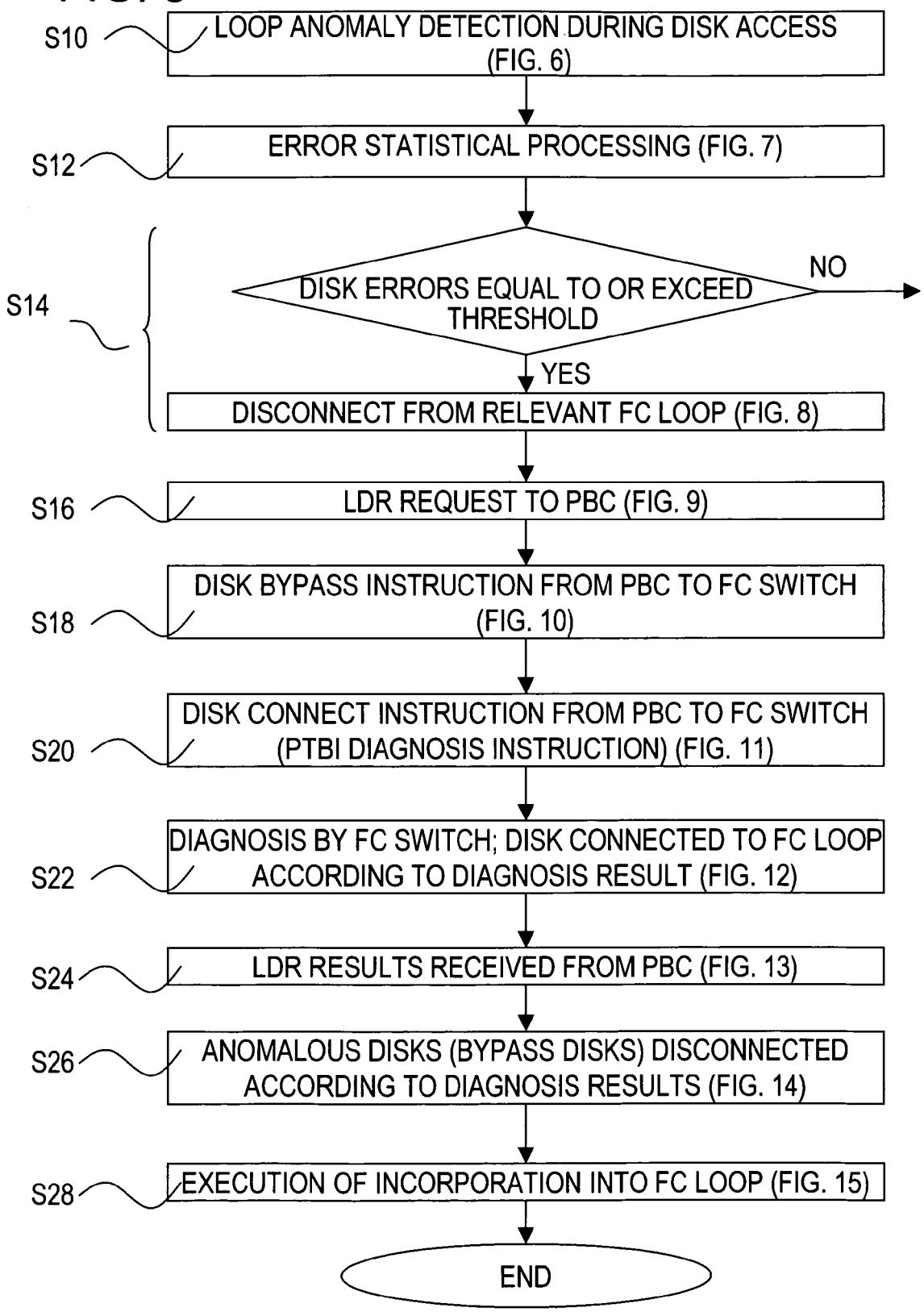
FIG. 5 shows the automatic restoration processing flow of an embodiment of the invention.

Next, FIG. 5 through FIG. 15 are used to explain automatic restoration processing in an embodiment of the invention. FIG. 5 shows the flow of automatic restoration processing in an embodiment of the invention, and FIG. 6 through FIG. 15 explain the operations therein. The flow of processing in FIG. 5 is explained referring to FIG. 6 through FIG. 15.

Figure 6:
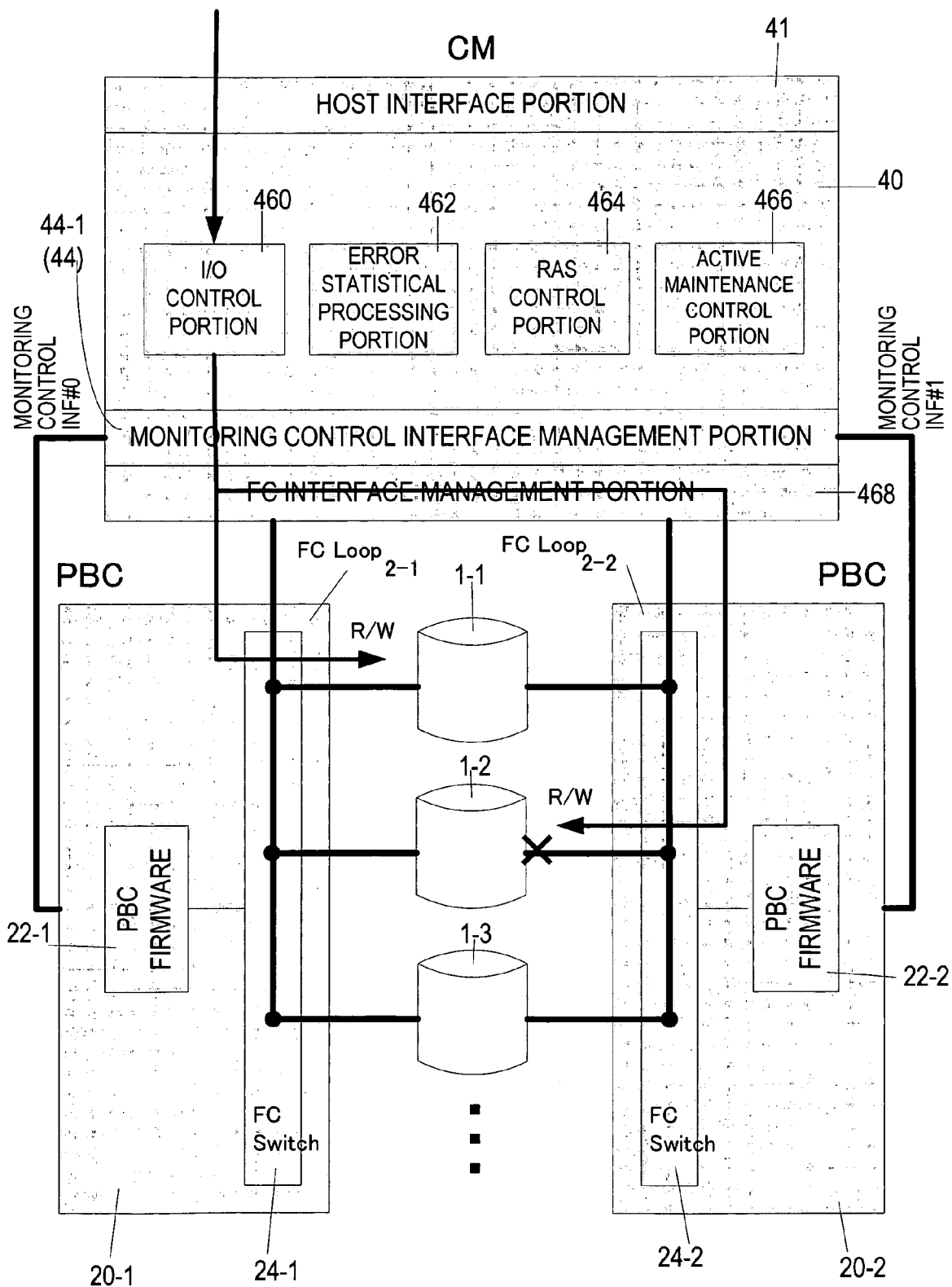
FIG. 6 explains the loop anomaly detection processing of FIG. 5.

First, in FIG. 6, the control program of the centralize module 40 is explained. The host interface portion 41 is the above-described channel adapter. The monitoring control interface management portion 44-1 is a monitoring control program executed by the service management controller 44.

The control unit 40 has programs which execute an I/O control portion 460, error statistical processing portion 462, RAS (Recovery Access System) control portion 464, active maintenance control portion 466, and FC interface management portion 468.

(S10) As shown in FIG. 6, a host request (read/write request) is received by the channel adapter 41, and the I/O control portion 460 of the control unit 40 is notified. The I/O control portion 460 performs read or write access of the magnetic disk drive in which the requested data exists, via the FC interface management portion 468, device adapter 42 which is not shown (see FIG. 1), and FC loop 2-1, 2-2. Here, a RAID-1 or higher configuration is employed, so that the magnetic disk drive 1-1 is accessed from the FC loop 2-1, and the magnetic disk drive 1-2 is accessed from the FC loop 2-2. The I/O control portion 460 monitors response to this access, and when there is response failure, judges that there is a loop anomaly for the disk drive from which there is no response. For example, when there is response failure (in the case of reading, no data is returned) due to an anomaly in the disk drive itself, an anomaly in the FC switch, or a connection fault between the disk drive and the FC switch, or when the FC switch is executing the above-described PTBI processing, then a response failure occurs.

Figure 7:
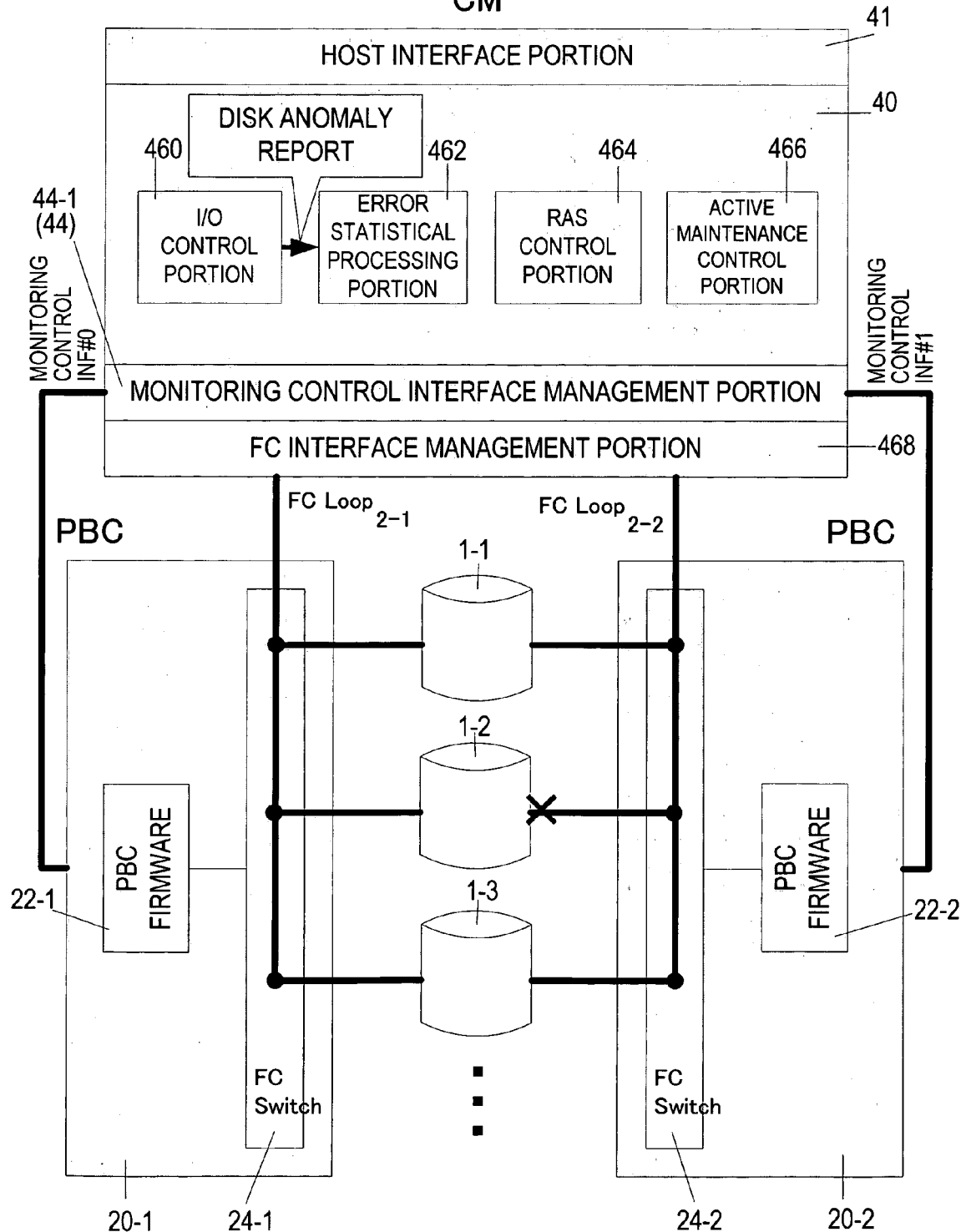
FIG. 7 explains the error statistical processing of FIG. 5.

(S12) Upon judging a loop anomaly to have occurred as described above, the I/O control portion 460 reports an anomaly for the disk drive from which there has been no response to the error statistical processing portion 462, as shown in FIG. 7. The error statistical processing portion 462 computes statistics for details of each error (error code).

Figure 8:
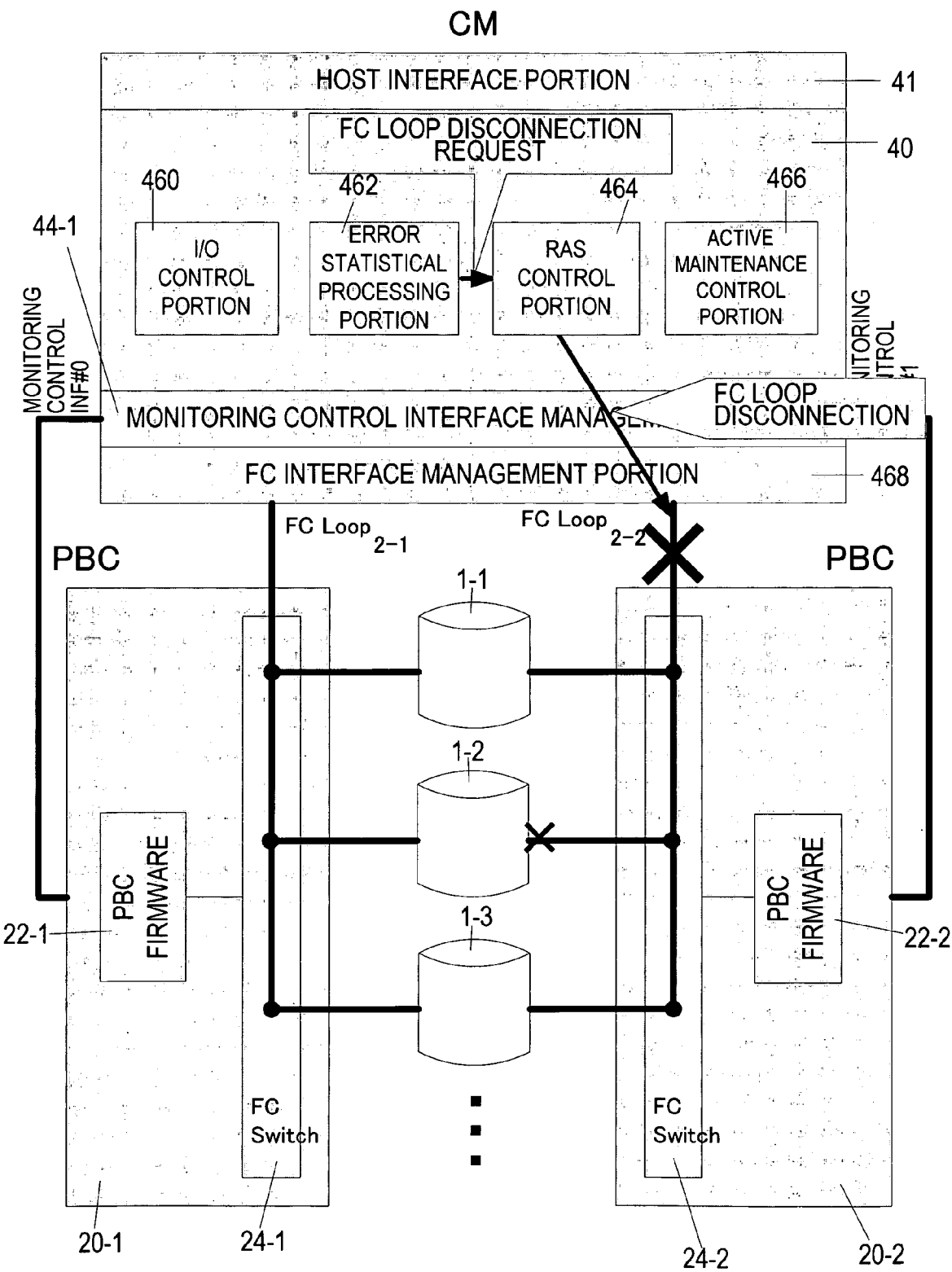
FIG. 8 explains the FC loop disconnect processing of FIG. 5.

(S14) The error statistical processing portion 462 counts the frequency of disk access errors, and when the frequency exceeds a threshold value, the RAS control portion 464 logically disconnects the relevant FC loop (here, FC loop 2-2), as shown in FIG. 8. That is, although physically connected, the control module 40 prohibits use of the FC loop 2-2.

Figure 9:
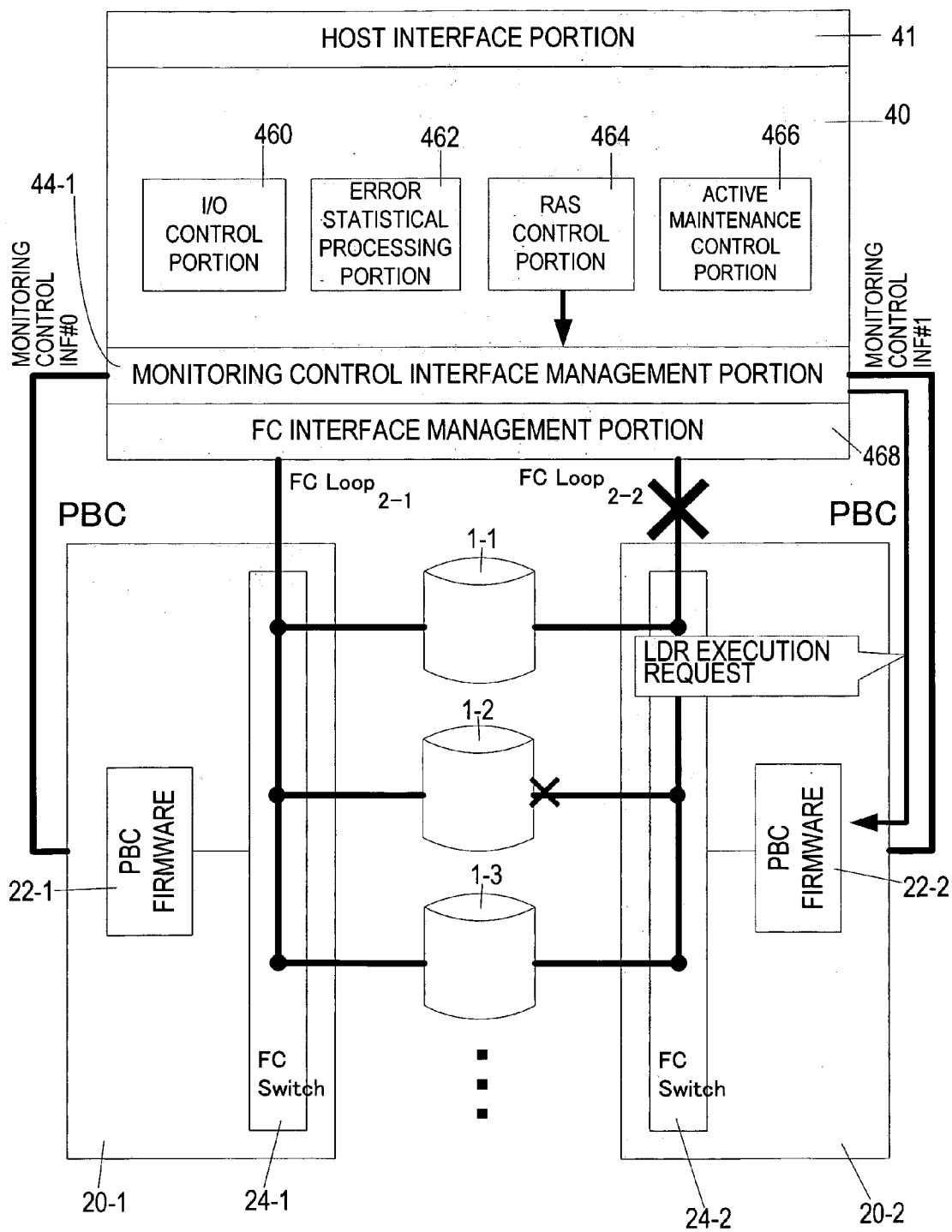
FIG. 9 explains the LDR request processing of FIG. 5.

(S16) As shown in FIG. 9, the RAS control portion 464 then requests automatic FC loop restoration of the monitoring control interface portion 44-1 of the service management controller 40, and the monitoring control interface portion 44-1 requests LDR (Loop Down Recovery) of the PBC (port bypass circuit) 22-2 of the relevant FC loop 2-2.

Figure 10:
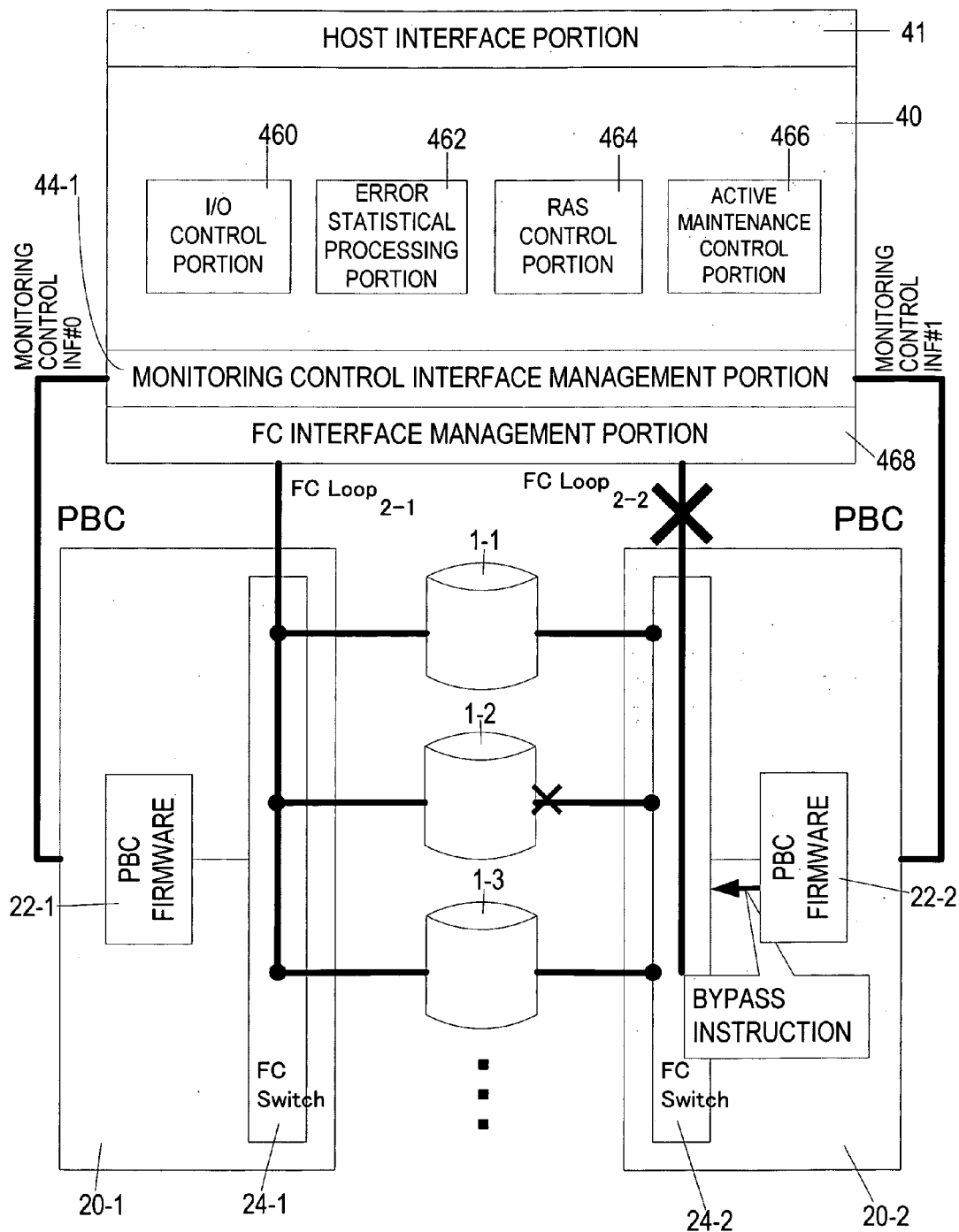
FIG. 10 explains the bypass instruction request processing of FIG. 5.

(S18) As shown in FIG. 10, the PBC 22-2 issues a bypass instruction to the FC switch 24-2. As a result, the FC switch control circuit 26 of the FC switch 24-2 bypasses all the port switches 28-1 to 28-*n* of the FC switch 24-2 from the FC loop 2-2. That is, the switches are initialized.

Figure 11:
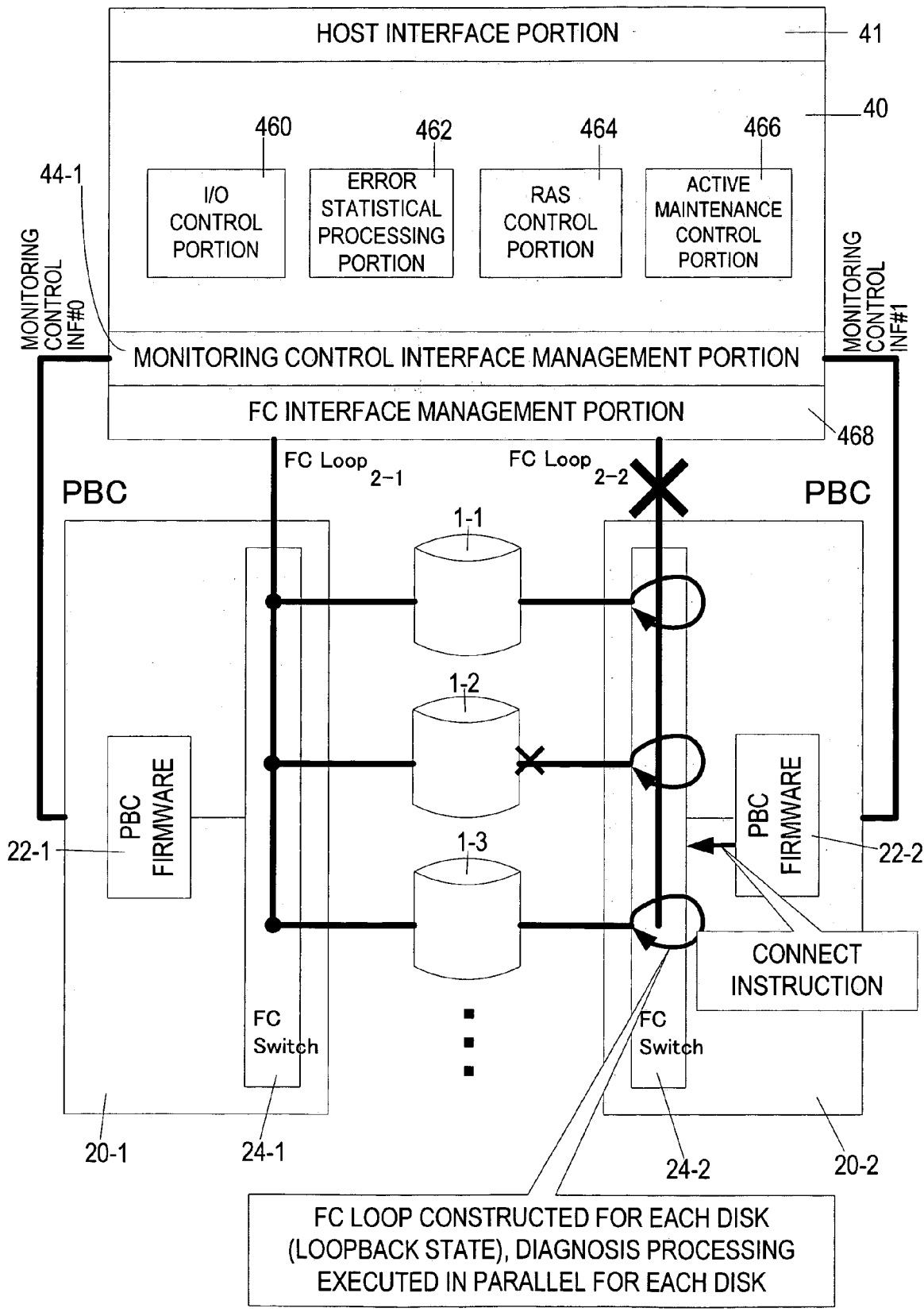
FIG. 11 explains the PTBI diagnosis processing instruction processing of FIG. 5.

(S20) As shown in FIG. 11, the PBC 22-2 issues a connect instruction to all switches of the FC switch control circuit 26. As a result of this connect instruction, the FC switch control circuit 26 performs a PTBI (Port Test Before Insertion) diagnosis, and performs connection.

Figure 12:
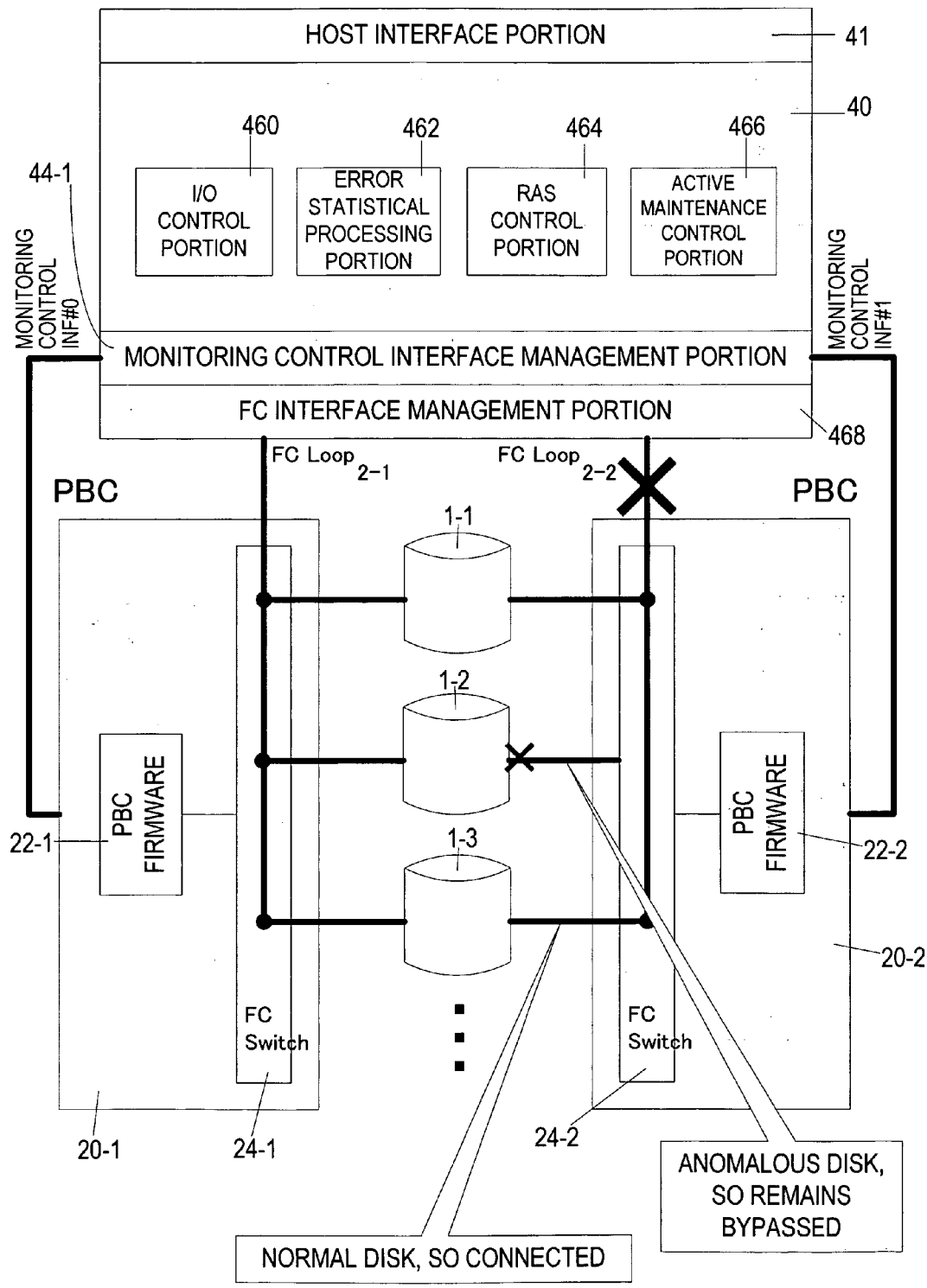
FIG. 12 explains the connect processing of FIG. 5.

(S22) That is, as shown in FIG. 12, the FC switch control circuit 26 performs loopback of all the port switches 28-1 to 28-*n*, as explained in FIG. 3. Through this switch loopback operation, N number of FC_AL loops that is connected a single disk drive are logically formed. An initialization process is executed for each of the N FC_AL loops, and the disk drive transmits frames to each of N FC_AL loops. That is, each of the disk drives 1-1 to 1-*n* independently comprises an FC loop, executes an initialization process, and transmits the frame signals. The FC switch control circuit 26 monitors the frame signals for each of the disk drives 1-1 to 1-*n*, and performs diagnoses of the individual disk drives 1-1 to 1-*n*. When for example there is an anomaly in a disk drive, a transmitted frame signal does not return, and so the disk drive is judged to be anomalous. The FC switch control circuit 26 connects the port switches of disk drives not judged to be anomalous, and bypasses the port switches of disk drives which are anomalous. That is, diagnosis processing is performed in parallel for all the disk drives.

Figure 13:
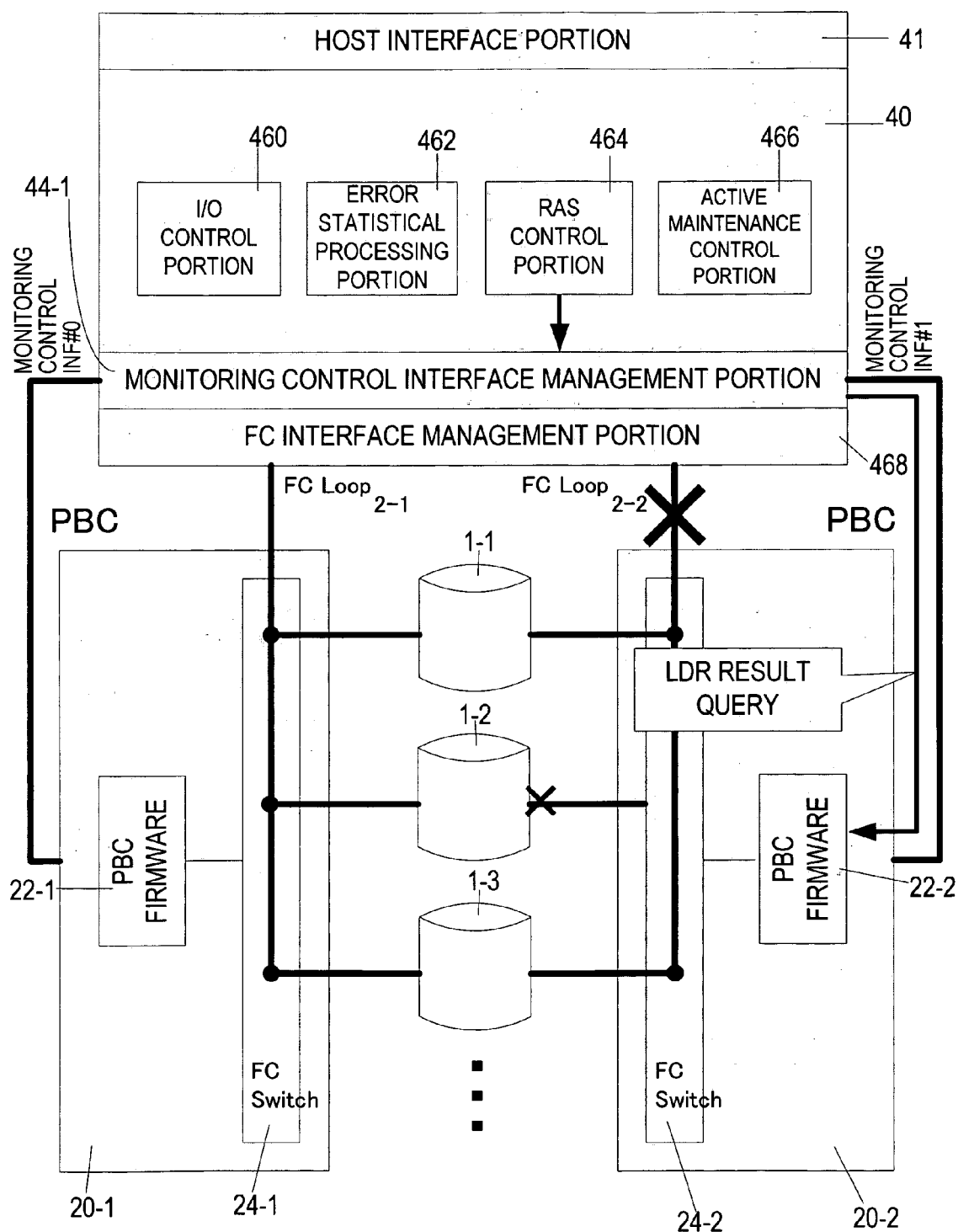
FIG. 13 explains the LDR execution result configuration processing of FIG. 5.

(S24) As shown in FIG. 13, while waiting the time required for this diagnosis processing, the RAS control portion 464 queries the PBC 22-2 for the LDR execution results via the monitoring control interface management portion 44-1. The PBC 22-2 receives the PTBI diagnosis results from the FC switch 24-2 and sends a response with the diagnosis results to the RAS control portion 464.

Figure 14:
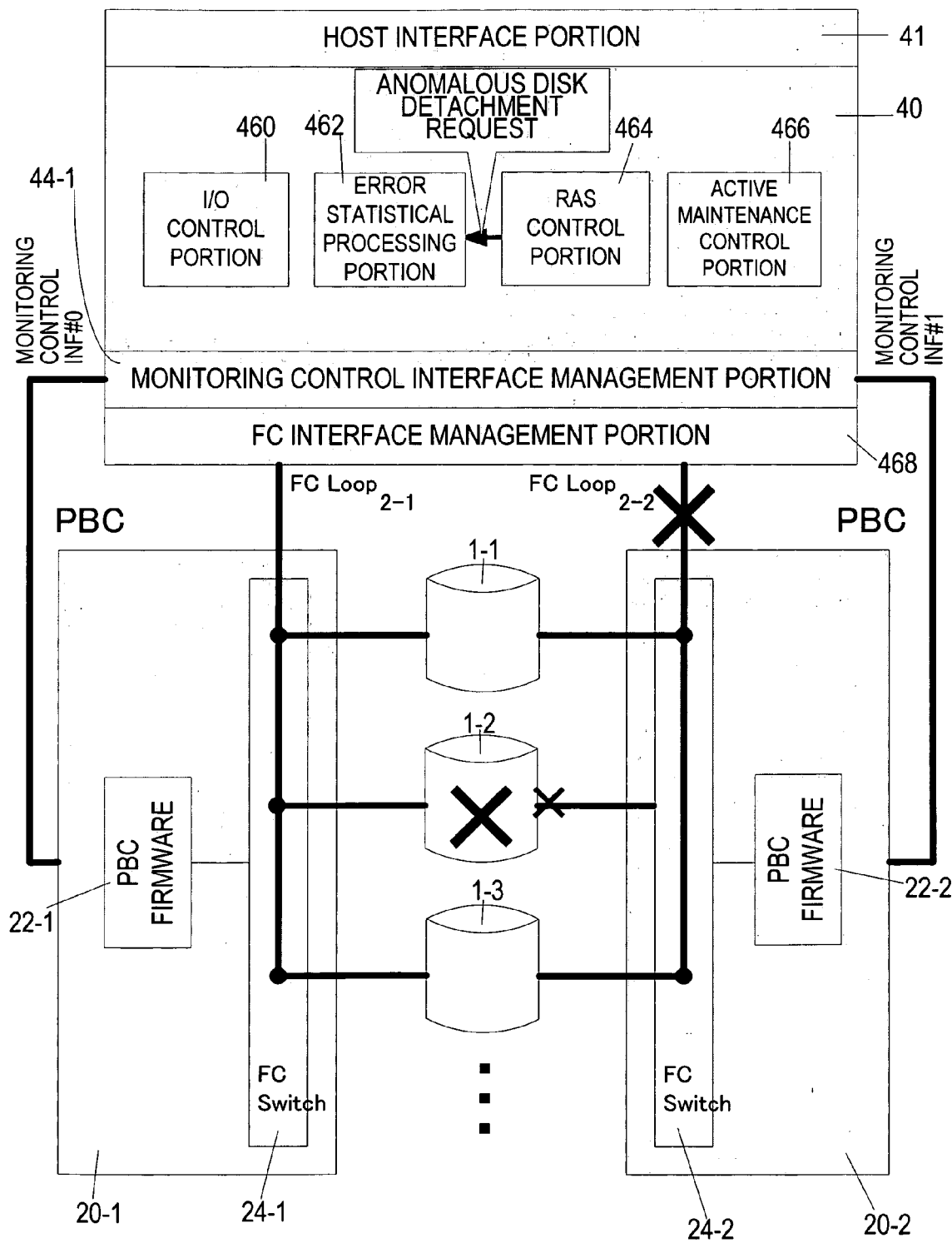
FIG. 14 explains the anomalous disk detachment processing of FIG. 5.

(S26) As shown in FIG. 14, the RAS control portion 464 issues a request to the error statistical processing portion 462 for disconnection of anomalous disks based on the diagnosis results. The error statistical processing portion 462 writes information indicating that the anomalous disk drives are faulty to the configuration information table of the disk drive management information (including the above-described error frequencies). By this means, the anomalous disk drives are logically disconnected.

Figure 15:
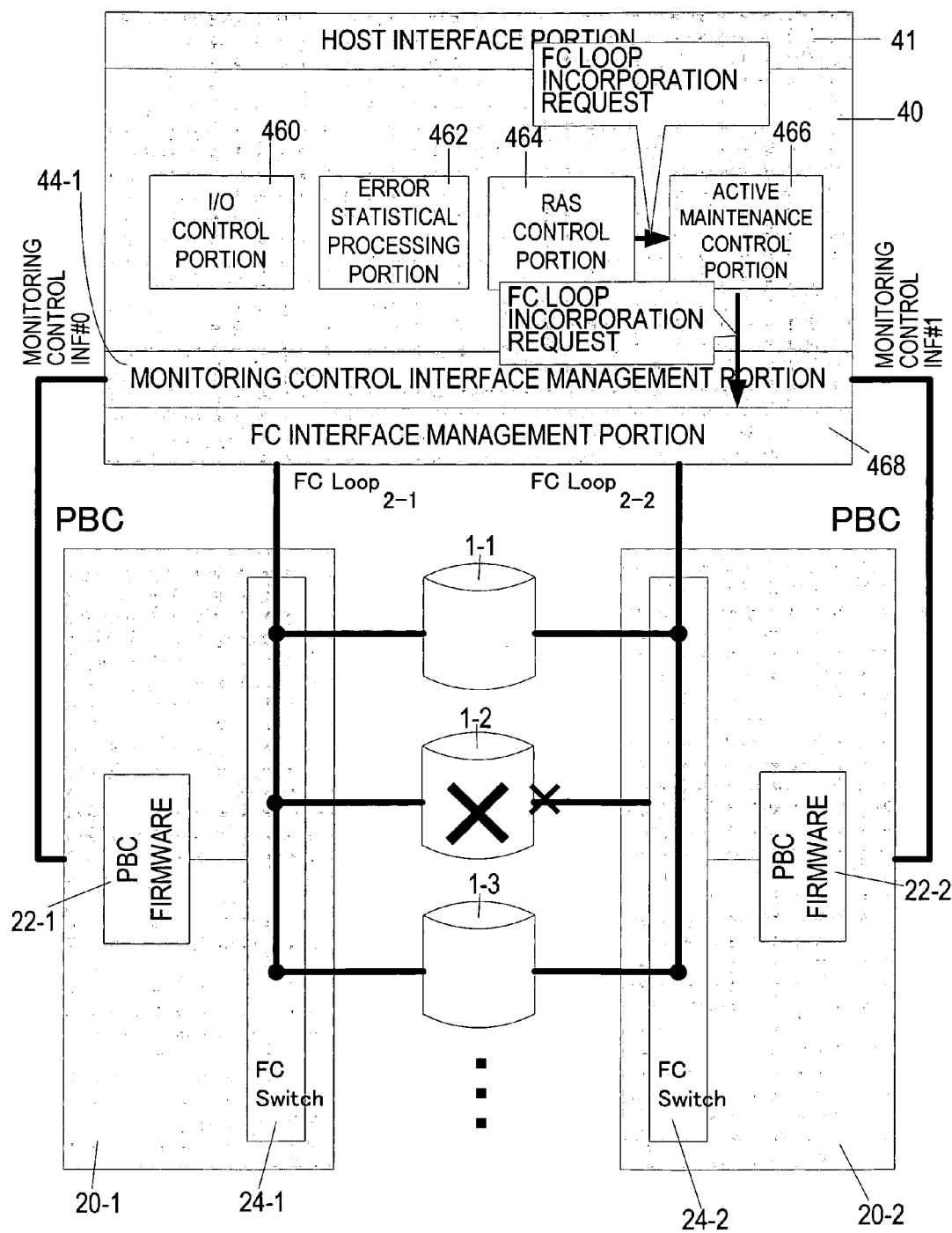
FIG. 15 explains the FC loop incorporation processing of FIG. 5.

(S28) As shown in FIG. 15, the RAS control portion 464 then issues a request for FC loop incorporation to the active maintenance control portion 466. The active maintenance control portion 466 acquires the WWN of each disk drive from the FC loop 2-2 and FC switch 24-2 via the FC interface management portion 468, and creates the FC loop map 414 shown in FIG. 4. Here, the anomalous disk drive 1-2 is in a bypassed state on the FC loop 2-2, and so the anomalous disk drive 1-2 is not incorporated into the FC map. That is, during disk access the I/O control portion 460 excludes the drive from the referenced FC loop map 414. By this means, unintentional accessing of an anomalous disk drive can be prevented. As a result, automatic restoration is completed, and the I/O control portion 460 can use the FC loop 2-2 to access disks.

In this way, when a loop anomaly is detected, diagnoses of the disk drives connected to the loop are performed in parallel, so that the time until automatic loop restoration is approximately several seconds, and can be shortened to from $\frac{1}{10}$ to $\frac{1}{60}$ approximately of the time required in the prior art.

Further, an FC switch having port test functions is used to perform diagnoses in parallel of the disk drives connected to the loop, so that the load on the control module is not so great. As a result, declines in the performance of disk access and cache control using the control module with no loop anomalies can be prevented, and in particular, performance in a RAID configuration when responding to hosts is improved.

Further, if there is an anomaly in a disk drive 1-2, then when accessing the disk drive 1-2 from a loop with no anomalies, the loop without anomalies is also judged to be anomalous, so that both loops are anomalous. But as in this aspect, automatic restoration processing is performed with one loop in the anomalous state, and so a case in which both loops are anomalous can be prevented.

Other Embodiments

In the above embodiments, when an anomaly occurs in one loop, automatic restoration processing is executed for that loop; but when there are anomalies in both loops, automatic restoration processing can also be performed for both loops.

Similarly, in cases where, with an anomaly in one loop, restoration is not possible even when automatic restoration processing is performed, when both loops have become unable to operate, by automatically starting functions for on/off diagnosis of the power supply of the device enclosure 2, diagnoses of all circuits of the print boards 20-1 and 20-2 can be performed, to execute restoration processing.

Further, in the above embodiments, the case of a redundant RAID configuration such as shown in FIG. 1 was explained; but application to storage systems with other redundant configurations is also possible. Further, application to various storage systems, employing as storage devices magnetic disks, optical disks, magneto-optical disks, and similar is possible.

In the above, embodiments of the invention have been explained; but various modifications can be made within the scope of the invention, and these modifications are not excluded from the scope of the invention.

Using a switch circuit having a plurality of switches to connect each of a plurality of storage devices to a loop, when a loop anomaly is detected, a restoration instruction is issued to the switch circuit, the plurality of switches are operated in parallel, the storage devices are diagnosed, and according to the diagnosis results, storage devices judged to be anomalous are bypassed from the loop by operating the switches, so that when a loop anomaly is detected it is possible to perform diagnoses in parallel of disk drives connected to the loop, and the time until automatic restoration of the loop can be greatly reduced.

What is claimed is:

1. A storage system for accessing storage devices according to data access requests from a requesting device, the storage system comprising:
    a plurality of storage devices;
    at least one controller that controls access to said plurality of storage devices;
    a pair of loops, in which information circulates in a single direction, to exchange information between said controller and said plurality of storage devices; and
    a plurality of switch circuits, provided in each of said pair of loops, each of said plurality of switch circuits comprising:
        a plurality of port switches that each connects and bypasses each of said plurality of storage devices to and from said loop and creates a loopback path from corresponding storage device of said plurality of storage devices to the corresponding storage device; and
        a switch controller that is connected to said loop and is connected parallel to said plurality of port switches and connects and bypasses each of plurality of port switches to and from the loop,
    wherein when said at least one controller detects a loop anomaly while accessing said storage devices, said at least one controller issues an instruction to restore said loop,
    and wherein the switch controller, in response to said instruction from said controller, bypasses all said plurality of port switches, creates said loopback path in all of said plurality of port switches connected to corresponding said storage devices after all of said port switches have been bypassed by parallel operating said plurality of port switches to diagnose said storage devices,
    and wherein said storage devices execute an initialization process and send a signal to said port switch in response to creation of the loopback path in the port switch, and the switch controller monitors the signals in said port switches from each of said storage devices, judges that a storage device that did not send the signal is anomalous, and disconnects said storage device judged to be anomalous from said loop.

2. The storage system according to claim 1, wherein when said at least one controller detects an anomaly in one of said loops during access of said storage devices via said one loop, said at least one controller issues said instruction to one of said switch circuits for said one loop.

3. The storage system according to claim 1, wherein said switch circuit, after execution of said diagnoses, connects the port switches of said storage devices not judged to be anomalous to said loop.

4. The storage system according to claim 1, wherein said at least one controller, in response to said diagnosis results, executes processing to incorporate said storage devices in said loop.

5. The storage system according to claim 1, wherein said at least one controller comprises:
    a control unit that controls access to a plurality of storage devices; and
    a service controller, connected to said switch circuits and said control unit, that issues said instructions for said restoration to said switch circuits.

6. The storage system according to claim 1, wherein said at least one controller comprises:
    a channel circuit that controls an interface with said requesting device;
    a device circuit that sends and receives information with said storage devices via said loops and said switch circuits;
    a control unit that controls said channel circuit and said device circuit and accesses said storage devices according to data access requests from said requesting device; and
    a service controller that is connected to said control unit and said switch circuits.

7. The storage system according to claim 1, wherein said plurality of storage devices have a RAID configuration.

8. The storage system according to claim 1, wherein said storage devices comprises disk drives.

9. An automatic restoration method of a storage system for accessing a plurality of storage devices in response to data access requests from a requesting device, comprising:
- detecting a loop anomaly during accessing of said plurality of storage devices by a controller connected to said plurality of storage devices via a pair of loops;
- issuing, in response to detection of said loop anomaly, an instruction to restore said loop from said controller to a switch circuit having a switch controller and a plurality of port switches, that each of said plurality of port switches connects said loop to each of said plurality of storage devices; and
- in response to said instruction from said controller, bypassing all said plurality of port switches to said loop by said switch controller;
- after all of said port switches have been bypassed, creating a loopback path in each of the plurality of said port switches from corresponding storage device of said the plurality of storage devices to the corresponding storage device by parallel operating said plurality of port switches of said switch controller;
- executing an initialization process and sending a signal to said port switch by said storage devices in response to creation of the loopback path in the port switch;
- monitoring the signals in said port switches from said storage devices by said switch controller;
- judging that a storage device that did not send the signal is anomalous to diagnose said storage devices by said switch controller; and
- according to the diagnosis results, bypassing said storage device judged to be anomalous from said loop by said switch controller.

10. The automatic restoration method of a storage system according to claim 9, wherein said issuing comprises, upon detecting an anomaly in one of said loops during accessing of said storage devices via said one loop, issuing an instruction for restoration of said loop to one of said switch circuits for said one loop.

11. The automatic restoration method of a storage system upon a loop anomaly according to claim 9, further comprising
- in response to the diagnosis results of said switch circuit, disconnecting said storage devices judged to be anomalous from said object of access of said controller.

12. The automatic restoration method of a storage system according to claim 9, further comprising, after executing said diagnosis by said switch circuit, connecting said loop to said storage devices not judged to be anomalous.

13. The automatic restoration method of a storage system according to claim 9, further comprising, in response to said diagnosis results, executing processing to incorporate said storage devices in said loop by said controller.

14. The automatic restoration method of a storage system according to claim 9, wherein said issuing comprises issuing said restoration instruction to said switch circuit from a service controller connected to a control unit that controls access to said plurality of storage devices and to said switch circuit.

15. The automatic restoration method of a storage system according to claim 9, wherein said plurality of storage devices have a RAID configuration.

16. A storage system for accessing storage devices according to data access requests from a requesting device, the storage system comprising:
- a plurality of said storage devices;
- a controller that controls access to the plurality of storage devices;
- a loop that exchanges information between the controller and the plurality of storage devices; and
- a switch circuit comprising:
  - a plurality of port switches that each connects and bypasses the loop to and from each of the plurality of storage devices and creates a loopback path from corresponding storage device of said plurality of storage devices to the corresponding storage device; and
  - a switch controller that is connected to said loop and is connected parallel to said plurality of port switches and connects and bypasses each of plurality of port switches to and from the loop,
- wherein the controller issues a restoration instruction to the switch circuit to restore the loop, when the controller detects a loop anomaly while accessing said plurality of storage devices, and
- the switch controller, in response to the restoration instruction, forms a plurality of logical loop that each of the plurality of logical loop logically connects each of the plurality of storage devices to the loop by creation of the loopback path in each of the plurality of port switches, diagnoses each of the plurality of storage devices in parallel sequence by judging whether the storage devices execute an initialization process and send a signal in response to formation of the logical loop, and according to the diagnosis results, bypasses an anomalous storage device judged that did not send the signal from the loop.

* * * * *